United States Patent Office 3,496,855
Patented Feb. 24, 1970

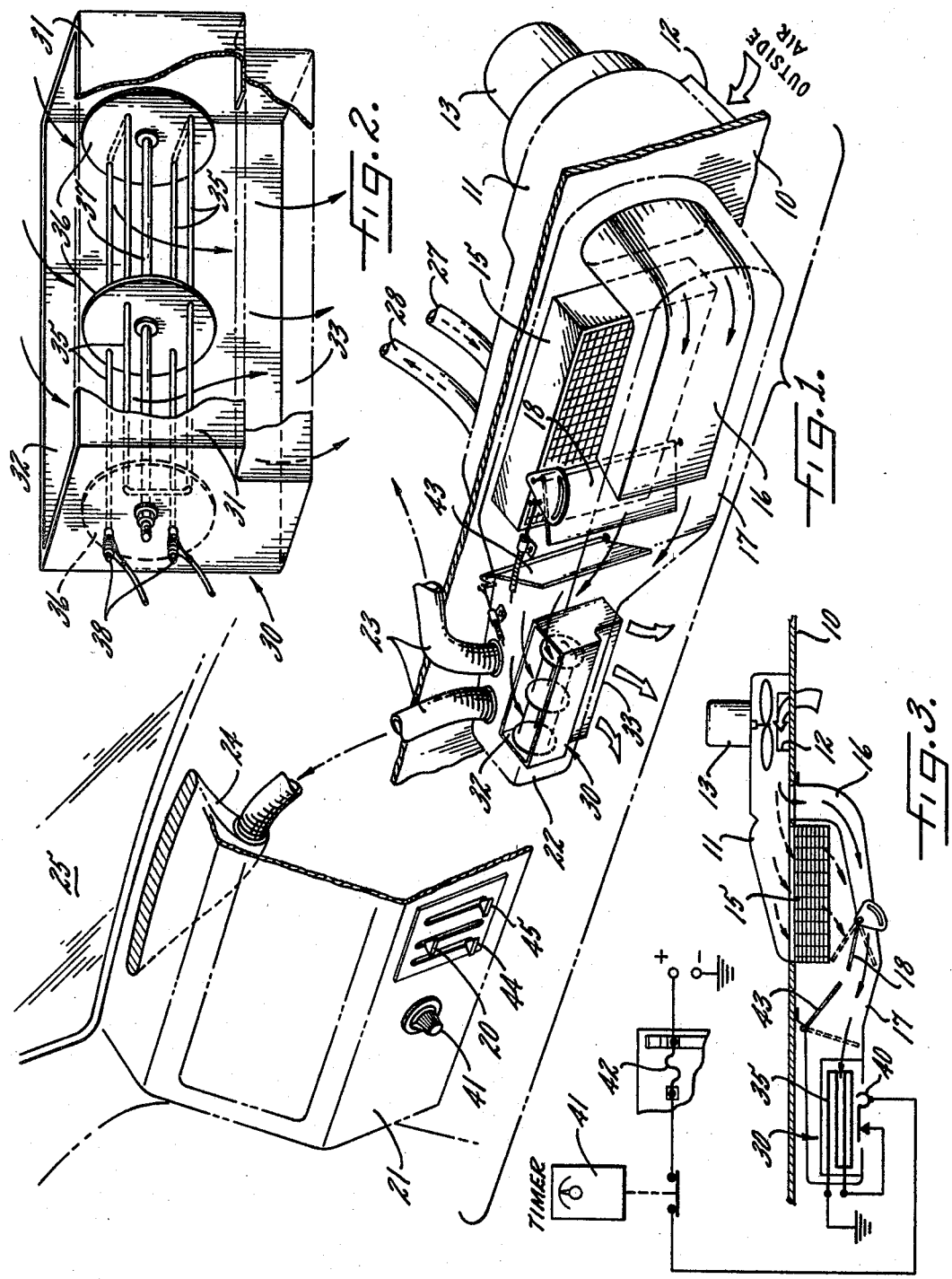

3,496,855
AUGMENTED AUTOMOBILE HEATING SYSTEM
Harry De Boer, R. Rte. 1, Box 243,
Chicago Heights, Ill. 60411
Filed Aug. 2, 1968, Ser. No. 749,658
Int. Cl. B60h 1/08, 1/22
U.S. Cl. 98—2                                    6 Claims

ABSTRACT OF THE DISCLOSURE

An electrically augmented heating system for motor vehicles is disclosed in which an auxiliary electrical heating unit powered by the vehicle battery is placed in series with the primary heater unit and controlled by a timer switch and thermostat in order to supply an immediate initial heating effect to air drawn into the vehicle prior to the time that the vehicle engine is sufficiently warm to supply the normal heating effect through the primary heater.

---

The present invention relates to motor vehicle heating systems, and in its principal aspect concerns an auxiliary source of heating effect for use when the vehicle has been initially started from a cold condition prior to the time that the normal vehicle heating system is warm enough for use.

Automobile owners are all familiar with the discomfort and inconvenience of waiting for the engine of their vehicle to warm up sufficiently so that a usable supply of heat can be obtained from the vehicle heating system. In cold weather it is often a matter of five or ten minutes before the vehicle heating system is able to supply enough heat to clear the windows of condensation, much less supply heat to the interior of the vehicle.

The foregoing is true whether the engine of the vehicle is cooled by liquid, as is usually the case, or by air. Liquid-cooled engines are generally adapted for heating purposes by tapping a supply of hot cooling liquid from the engine water jacket and directing it through a heater core by means of the cooling pump of the engine itself. A return line carries the fluid back to the engine cooling system. It is generally a matter of several minutes, even in sumer, before such an engine reaches its operating temperature when started from cold. During this time substantially no heat at all is available for the interior of the vehicle. Air-cooled engines operate somewhat differently, with a steady stream of engine cooling air being directed over finned engine cylinder heads by a cooling fan. A portion of this air is tapped off and directed to a heat exchanger, which in turn heats air for the interior of the vehicle. Air-cooled engines are known to be somewhat more effective in supplying an immediate source of heat for interior purposes, but the rate of temperature rise is generally inadequate to allow the vehcile to be driven off from a cold start and still have heat for both defrosting windows and warming the interior.

In view of the foregoing, it is a principal object of the present invention to provide an electrically augmented heating system for motor vehicles in which an instant supply of heat is available for use in warming the interior or defrosting windows, in spite of the fact that the engine cooling system may still be relatively cold.

Another object is to provide a heating system of the above description in which the electrical augmentation is safely controlled so that no part of the system is allowed to overheat, and in which the system is effective to turn itself off in the event that the augmentation is forgotten by the operator.

A further object of the invention is to provide such a system in which the augmentation is usable either separately or in various degrees of combination with the existing primary heating system, including the heater blower, defrosting system, and controlable exterior air inlets.

These and other objects and advantages of the invention will become apparent upon reading the following detailed description and upon reference to the drawings, in which:

FIGURE 1 is a partial schematic perspective showing an augmented motor vehicle heating system exemplifying the present invention as it would appear in a passenger automobile;

FIG. 2 is an enlarged perspective of the auxiliary heating unit shown in FIG. 1, with a portion of the surrounding shroud broken away for clarity; and FIG. 3 is a schematic air flow and electrical circuit diagram of the apparatus shown in the preceding figures.

While the present invention is shown and described in connection with a particular exemplary embodiment, it will be understood that it is not intended to so limit the invention, but it is instead intended to cover all alternative and equivalent constructions as may be included within the spirit and scope of the invention as defined by the appended claims.

Turning to the drawings, there is shown in FIG. 1 an exemplary heating system as incorporated in a modern passenger automobile. Carried by a main bulkhead or firewall 10 are an inlet duct 11 having an inlet opening 12 from which air is drawn from outside the vehicle. A powered blower 13 forcibly directs a stream of unheated air from the opening 12 through a primary heater heat exchanger core unit 15 attached to the opposite side of the bulkhead 10. A bypass duct 16 is also provided through which air may pass without going through the primary heater core 15.

Downstream of the heater core 15 and bypass duct 16 is a mixing chamber 17 in which the parallel streams of air from the heating core 15 and bypass duct 16 are allowed to mix. A bypass damper 18 is provided, controlled by suitable lever means 20 on the vehicle dashboard 21 for selectively mixing the parallel streams in varying amounts so that any desired temperature between those of the two streams may be achieved. From the mixing chamber 17 the heated air passes into the interior of the vehicle through a heater outlet 22 or through defroster ducts 23 which connect with defroster outlets 24 disposed beneath the windshield 25 of the vehicle.

The primary heater core 15 of the vehicle is a conventional heat exchanger radiator connected by an inlet conduit 27 and an exit conduit 28 to the engine. In the illustrative case, a liquid-cooled engine is contemplated.

As a principal feature of the invention, the heating system of the vehicle is augmented to provide an immediate or instant heating effect even when the primary heating core 15 is cold due to the lack of hot water from the engine. This is achieved through the use of an auxiliary or augmenting heat exchanger unit 30 which is electrically powered from the battery (not shown) of the vehicle itself. The auxiliary unit 30 consists of a shroud 31 open at an inlet end 32 having an exit opening 33 communicating with the heating outlet 22 and defroster ducts 23 of the usual vehicle heating system. Within the shroud 31 is a relatively long wire resistance unit 35 which is interlaced between supporting insulating discs 36, which discs are in turn supported by a central support rod 37 mounted at one end or wall of the shroud 31. The two ends of the resistance wire 35 terminate in electrical terminals 38 which are then connected by circuit means (FIG. 3) to the vehicle battery.

As another feature of the invention, the auxiliary heating unit 30 is protected against overheating through the use of a thermostat 40 (FIG. 3) which interrupts the circuit of the resistance heating wire 35 when the interior of the shroud 31 reaches a predetermined temperature value. Thus, if the auxiliary heating unit 30 is inadvertently energized when the vehicle is fully warmed up and able to supply maximum heating effect from the primary heating core 15, the thermostat 40 protects the auxiliary heating unit 30 from excessive temperatures.

Further protection is provided in the event that the operator neglects to de-energize the auxiliary heating unit when leaving the vehicle, or after the vehicle has warmed up. This is achieved through a timer switch 41 which breaks the circuit of the resistance wire element 35 after a predetermined time interval has passed from the time the unit was turned on. Such timer switch units are commonly available, and generally utilize a hand-wound clockwork mechanism which closes the circuit on winding and which automatically opens the circuit again after the mechanism has run down. If desired, the operator can renew the operation of the auxiliary heating unit 30 by merely resetting the timer switch 41. This may be desirable during periods when a highly augmented heat output is desired, or when the vehicle engine is not running, such as when parked. A fuse 42 is included to protect the electrical system from damage in the event of a short circuit.

Also seen in figures are other portions of the usual automobile heating systems, including a heater air baffle 43 and control lever 44, and a blower switch 45 for controlling the motor of the blower means 13.

It will be appreciated that the invention is equally applicable to vehicles using air-cooled engines in which the primary heater core 15 is heated by the engine cooling air, rather than water as in the illustrated embodiment.

I claim as my invention:

1. In a motor vehicle having an internal combustion engine and fluid engine cooling means, including pump means for supplying warmed engine cooling fluid for heating purposes after the engine has reached operating temperature, an augmented heating system comprising, in combination,
a primary heat exchanger for transferring heat from the engine cooling fluid to a stream of air, and fluid conduit means connecting the primary heat exchanger to the engine cooling means;
air duct means for introducing a stream of air into the interior of the vehicle through a path including the primary heat exchanger;
blower means for forcing a stream of air through the air duct means; and
selectively operable auxiliary heat exchanger located in the air duct means, said auxiliary heat exchanger including a plurality of electrically energized heating elements disposed in a spaced array within said duct for conductive and convective heat transfer, and circuit means for connecting the auxiliary heating exchanger to a source of electrical energy.

2. The apparatus defined in claim 1 in which the circuit means includes
thermostat means for interrupting the supply of electrical energy to the auxiliary heat exchanger after said exchanger has reached a predetermined operating temperature; and
timer switch means for allowing selective energization of the electrical heating elements for an operating cycle not exceeding a predetermined time interval selected by the operator unless intentionally reset before the expiration of such time.

3. The apparatus defined in claim 2 in which the source of electrical energy for operating the auxiliary heat exchanger unit constitutes an electrical storage battery in the motor vehicle.

4. The apparatus defined in claim 1 in which said air duct means includes a bypass duct and a bypass damper, whereby a stream of unheated air may be selectively bypassed both through and around the primary heat exchanger in varying proportions, and a mixing chamber downstream of the primary heat exchanger for mixing the streams of heated and unheated air issuing from the primary heat exchanger and bypass duct, respectively.

5. Apparatus as defined in claim 1 including window defroster means partaking of heated air within said air duct means from a point downstream of the auxiliary heat exchanger.

6. Apparatus as defined in claim 1 in which the auxiliary heat exchanger comprises a shroud, a central support axially aligned and centered within said shroud, a plurality of discs centrally supported on said support, a resistance wire heating element interlaced between said discs and supported thereby, and electrical contact terminals at each end of said wire heating element protruding from and supported by one end of said shroud for connection to said source of electrical energy.

References Cited

UNITED STATES PATENTS 2,268,478    12/1941    Fehrer _____ 98—2

MEYER PERLIN, Primary Examiner

U.S. Cl. X.R.

165—42